United States Patent [19]

Stahlheber et al.

[11] Patent Number: 4,661,331

[45] Date of Patent: Apr. 28, 1987

[54] CONTINUOUS PROCESS FOR PREPARING SODIUM ORTHOPHOSPHATE SLURRIES FROM NATURAL SODA ASH AND ORTHOPHOSPHORIC ACID

[75] Inventors: N. Earl Stahlheber, Columbia, Ill.; John E. Lyon, Florissant, Mo.

[73] Assignee: Monsanto Company, St. Louis, Mo.

[21] Appl. No.: 653,182

[22] Filed: Sep. 24, 1984

[51] Int. Cl.⁴ .............................................. C01B 25/30
[52] U.S. Cl. ................................... 423/309; 423/313; 423/315
[58] Field of Search ................ 423/315, 312, 309, 313

[56] References Cited

U.S. PATENT DOCUMENTS

| | | | |
|---|---|---|---|
| 1,688,112 | 10/1928 | Booth et al. | 423/313 |
| 3,086,844 | 4/1963 | Beltz et al. | 423/309 |
| 3,409,392 | 11/1968 | Shaver | 423/309 |
| 3,441,374 | 4/1969 | Shen | 423/312 |
| 3,591,334 | 7/1971 | Hudson et al. | 423/313 |
| 4,224,294 | 9/1980 | Powers | 423/315 |

FOREIGN PATENT DOCUMENTS

| | | | |
|---|---|---|---|
| 557623 | 5/1958 | Canada | 423/313 |
| 1300529 | 8/1969 | Fed. Rep. of Germany | 423/313 |
| 1388249 | 3/1975 | United Kingdom | 423/309 |
| 411728 | 9/1977 | U.S.S.R. | 423/313 |

*Primary Examiner*—John Doll
*Assistant Examiner*—Wayne A. Langel
*Attorney, Agent, or Firm*—R. Loyer

[57] ABSTRACT

Unmilled commercially available granular "natural" soda ash is reacted with orthophosphoric acid to produce a highly concentrated slurry at a molar Na:P ratio of about 1.5 in a continuous process. Problems associated with incomplete reaction are solved and the slurry can be dried to the double salt $Na_3H_3(PO_4)_2$ or reacted with aqueous sodium hydroxide to produce a superior precursor for manufacturing sodium tripolyphosphate.

11 Claims, No Drawings

4,661,331

CONTINUOUS PROCESS FOR PREPARING SODIUM ORTHOPHOSPHATE SLURRIES FROM NATURAL SODA ASH AND ORTHOPHOSPHORIC ACID

This invention relates to the production of sodium orthophosphate slurries. More particularly, this invention relates to an improved process for the production of a concentrated slurry with a molar Na:P ratio of approximately 1.5 containing less than 2% unreacted soda ash, wherein the alkali source is granular "natural" soda ash. The invention further relates to a continuous process whereby the reacted slurry is adjusted with aqueous sodium hydroxide to produce a superior precursor for manufacturing sodium tripolyphosphate.

BACKGROUND OF THE INVENTION

Commercially, sodium orthophosphates have traditionally been prepared as aqueous solutions, using either soda ash or aqueous sodium hydroxide as the alkali source. In some cases, such as in preparation of trisodium phosphate, both soda ash and sodium hydroxide are used sequentially. Where there is a mere choice between soda ash and sodium hydroxide, soda ash has generally been preferred because it is usually lower in price and overall cost of use than sodium hydroxide. Particularly in the manufacture of sodium tripolyphosphate, where energy costs for water evaporation are a significant economic factor, soda ash has been preferred, and processes have been developed for production of concentrated slurries of the orthophosphate precursor.

However, there has been a change in the method of soda ash manufacture and in the properties of the product. The Solvay process, which produces a fine, reactive soda ash, has almost completely been replaced in the United States by various processes which convert mineral deposits of "natural" sodium carbonate to a denser, more granular, less reactive soda ash. It has been believed that such granular natural soda ash must be fine milled to be useful in preparing sodium orthophosphate slurries suitable for sodium tripolyphosphate manufacture, U.S. Pat. No. 4,224,294 issued Sept. 23, 1980 to E. J. Powers. One reason for this belief has been the observation, in efforts to prepare sodium orthophosphate slurries, that a large proportion of the natural soda ash has remained unreacted, even after hours of boiling the slurry. It has been postulated that large particles of soda ash become coated with a layer of crystalline disodium phosphate dihydrate, $Na_2HPO_4 \cdot 2H_2O$, and are thereby rendered inert to further reaction.

There are many problems related to the milling of granular natural soda ash, among which are the cost of milling and special handling and equipment required, separate storage facilities, and the poor flow properties of fine-milled soda ash which cause difficulty in achieving uniform and consistent feed to processing equipment. These disadvantages are overcome by the present process which produces a concentrated, essentially carbonate-free, slurry of sodium orthophosphate using granular natural soda ash thereby avoiding the need to premill the natural soda ash. There is another problem related to the formation of a slurry suitable for the manufacture of pentasodium tripolyphosphate (STP). This problem results from the tendency of disodium orthophosphate, a constituent of STP precursor (a mixture of salts, principally disodium orthophosphate and the double salt whose chemical formula is $Na_2H_3(PO_4)_2$), to form a dihydrate at temperatures below 95° C. The dihydrate crystal robs the slurry of water, increasing its viscosity, and also tends to form large crystals, which reduces the slurry homogeneity necessary to produce high assay STP. The present process avoids dihydrate formation with the resultant increased viscosity, decreased homogeneity, and ultimately lower assay STP and is a further advancement in the art.

SUMMARY OF THE INVENTION

These and other advantages are achieved by a continuous process for preparing a slurry of the double salt $Na_3H_3(PO_4)_2$ containing less than 2% by weight unreacted sodium carbonate which comprises:
(a) providing a reaction medium at a temperature above 80° C. having a molar Na:P ratio in the range of about 1.42 to about 1.58 and an uncombined water content of about 7% to about 20% by weight; and
(b) adding to the reaction medium with agitation granular natural soda ash and phosphoric acid substantially simultaneously in such proportions, rate and acid concentration to maintain said molar Na:P ratio and said uncombined water content and to provide a sojourn time of at least about 12 minutes at a temperature above 80° C.

A further embodiment of this invention is the preparation of pentasodium tripolyphosphate precursor which comprises collecting the reaction mixture in a separate vessel and adding, with agitation, sufficient sodium hydroxide to the reaction mixture maintained at a temperature in the range of 95° to 105° C. to provide a molar Na:P ratio of about 1.64 to about 1.70.

DETAILED DESCRIPTION OF THE INVENTION

It has been discovered that commercially available granular natural soda ash can be used as received by mixing the soda ash and phosphoric acid in a suitable reaction medium of sodium orthophosphate slurry as hereinafter described. The suitable reaction medium is self-sustaining with the addition of fresh raw materials in suitable proportions and the excess product overflows downstream in a continuous process. The product slurry, containing less than 2% unreacted sodium carbonate, is valuable as a precursor for various sodium phosphate products, and particularly, for pentasodium tripolyphosphate by molar Na:P ratio adjustment as hereinafter described.

In one embodiment of this invention there is provided a process for preparing the double salt, represented by $Na_3H_3(PO_4)_2$, containing less than about 2% by weight unreacted soda ash in slurry form which comprises: (a) providing a reaction medium with a molar Na:P ratio of approximately 1.5 i.e. 1.42 to about 1.58, at a concentration of 80–93% solids, i.e. 7–20% uncombined water, and at a temperature above about 80° C., in a back-mixed reaction system such as a ribbon blender; and (b) adding granular natural soda ash and phosphoric acid substantially simultaneously with agitation to the reactor at such rate and proportion to provide at least 12, and preferably at least 15 minutes sojourn time in the back-mixed system, and to maintain the molar Na:P ratio at approximately 1.5. The phosphoric acid is of such concentration as will maintain a slurry concentration of 80–93%, and preferably 85–88%.

In a further embodiment of the present invention, pentasodium tripolyphosphate precursor, a mixture of sodium phosphates with an Na:P molar ratio of 1.67, is prepared by reacting at a temperature of at least 95° C. the primary slurry which discharges from the reactor in a separate mixing vessel with a sufficient amount of aqueous sodium hydroxide to provide a resultant slurry having a molar Na:P ratio of about 1.64 to about 1.70, preferably about 1.67. This reaction can be conducted batchwise, semi-continuously or continuously. Suitable aqueous sodium hydroxide is a solution containing up to about 75% by weight sodium hydroxide. Good results are obtained with 50% by weight aqueous sodium hydroxide which is preferred. The adjustment of the molar Na:P ratio is preferably conducted at a temperature in the range of about 95° C. to about 110° C.

The natural granular soda ash which can be used in accordance with this invention is commercially available as "light", "medium", and "dense" grades, ranging in density from about 800 kg/m$^3$ to about 1070 kg/m$^3$, and in a particle size range of 88 to 90% between 20 and 100 mesh USSS (0.84–0.149 mm opening). By contrast, the more reactive Solvay process "light" soda ash normally has a bulk density near 575 kg/m$^3$, and a particle size range of 70% smaller than 100 mesh.

The phosphoric acid ($H_3PO_4$) reactant is concentrated phosphoric acid having a $H_3PO_4$ concentration between 75% and 92% by weight, preferably 80–86%, particularly about 85%. Although acid concentrations below 75% can be used, the value of this process becomes progressively diminished because of the unnecessary water so introduced. Concentrations higher than 86%, or even 92%, may be used, by adding sufficient water separately to provide the necessary slurry fluidity for complete reaction.

The process for producing the primary slurry is a continuous process in that it contemplates maintaining a steady state of operation wherein raw materials are continuously metered to a reaction medium of properties capable of being maintained as reaction proceeds. Before describing conditions whereunder such reaction medium properties may be maintained, it is first necessary to understand some general characteristics of the reaction between soda ash and phosphoric acid, which can be defined by the equation:

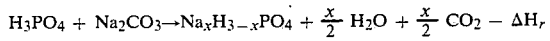

$$H_3PO_4 + Na_2CO_3 \rightarrow Na_xH_{3-x}PO_4 + \frac{x}{2} H_2O + \frac{x}{2} CO_2 - \Delta H_r$$

Firstly, the term $Na_xH_{3-x}PO_4$ signifies that various orthophosphate salts are produced as a function of the proportions of the materials used (i.e., the value of "x"), the temperature and the amount of water added to the system. In the gross stoichiometry, or in isolated sites within the reactor, it is possible for conditions to exist which would produce a spectrum of salts, which in turn may modify the gross characteristics of the reaction medium. For example, the desired reaction medium, which contains crystals of the double salt, $Na_3H_3(PO_4)_2$, in a saturated solution of the same composition, may under improper conditions of processing, be converted to a complex mixture of monosodiumphosphate ($NaH_2PO_4$), the double salt, $Na_3H_3(PO_4)_2$, hydrated or anhydrous disodiumphosphate ($Na_2HPO_4$) and hydrated or anhydrous sodium carbonate ($Na_2CO_3$) all in a solution of variable composition.

Secondly, the term

$$\frac{x}{2} CO_2$$

signifies that the reaction evolves gas. The volume of gas evolved is large, about 350 times the volume of the reactants used. Thus, the desired reaction medium will have little tendency to retain the evolved gas or produce foam. Under improper conditions of operation, the foaming tendency is so great that the measured slurry density is lower than 5 pounds per gallon (0.60 grams per cc). Under proper conditions, the slurry density is 8–14 pounds per gallon (0.96–1.68 grams per cc).

Finally, the term $-\Delta H_r$ signifies that the reaction is exothermic and that the reaction rate increases as the temperature rises. It will be understood by those skilled in the art that achieving maximum reaction rate in a system as described here requires careful management of both reaction and sensible heat fluxes.

Thus, this invention involves a dynamic system wherein the desired proportion of phosphoric acid and soda ash are reacted together in a stable reaction medium of a definite range of compositions, densities, and temperatures. A certain minimum average residence or sojourn time is specified for essentially complete reaction.

Particularly good results are obtained by maintaining the range of sodium orthophosphate compositions formed by the reaction of natural soda ash and phosphoric acid to provide a molar Na:P ratio of from about 1.42 to about 1.58, preferably from about 1.48 to about 1.56, more preferably, at about 1.53 and an uncombined water content of about 7–20% by weight, preferably 10–17%, more preferably at about 15%. It is advantageous to maintain the temperature of the reaction mixture above 80° C., particularly about 90° C. but less than about 100° C., with sufficient agitation in a well ventilated reactor to promote reaction and the escape of the resultant carbon dioxide. The rate of addition of the reactants to the reactor is adjusted to provide a sojourn time of at least 12 minutes, preferably at least 15 minutes, say about 15 to 60 minutes or more. Sojourn times greater than two hours can be used however advantageous results can be achieved using more efficient shorter sojourn times.

In the further embodiment of the invention for the preparation of STP precursor the primary slurry overflows the reactor into a separate vessel equipped with suitable means for agitation and adding sufficient aqueous sodium hydroxide with agitation to adjust the molar Na:P ratio of the composition to about 1.64 to about 1.70, preferably to about 1.67, while maintaining the temperature at least 95° C., preferable in the range 95°–110° C.

In view of the present description of this continuous steady state process for the manufacture of sodium orthophosphate composition, it will be understood by those skilled in the art that various means are readily available for controlling the temperature, uncombined water content and the rate of addition of the reactants to achieve the advantages of the present invention.

This process can be conducted in conventional well ventilated slurry process equipment such as ribbon blenders, kneaders, agitators, mixers and the like to provide uniform mixing and venting of the resultant carbon dioxide.

The invention is further illustrated by, but not limited to, the following examples wherein all parts, ratios and percents are by weight, unless otherwise indicated.

EXAMPLE 1

A mixture of 15 pounds (6.8 kg) monosodiumphosphate and 20 pounds (9.0 kg) of disodium phosphate was charged into a double helix ribbon blender, 18 inches (46 cm) long by 12 inches (30.5 cm) diameter, and heated with enough water to form an 82% slurry at 80° C. The mixture was agitated for one hour and analyzed by XRD which revealed that the only solid species then present was the double salt, $Na_3H_3(PO_4)_2$. Granular natural soda ash and 85% phosphoric acid were then added simultaneously at a rate of 0.211 pounds (95.7 grams) and 0.300 pounds (136 grams) per minute respectively. When slurry product overflowed the discharge port located two inches (5 cm) above the mixer shaft, samples were taken for determination of free water, residual carbonate and molar Na:P ratio, with the following results. The residual sodium carbonate ranged from 0 to 0.95% by weight of sample, the uncombined water content ranged from 13.1% to 15.7% by weight and the Na:P molar ratio ranged from 1.50 to 1.51.

Example 1 shows that the reaction between granular natural soda ash and 85% phosphoric acid goes essentially to completion on a continuing basis at an Na:P molar ratio of about 1.5. The sojourn time was about one hour during this run of five and one-half hours.

EXAMPLE 2

Water, soda ash and 85% phosphoric acid were charged into a 30 inch (76 cm) long by 18 inch (45.7 cm) diameter double helix ribbon blender with an overflow port two inches (5 cm) above the mixer shaft, and heated to provide a reaction medium of about 80% solids at a molar Na:P ratio of 1.53 and at a temperature of about 90° C. Granular natural soda ash and 85% phosphoric acid were then added continuously at a rate of 78.8 pounds (36 kg) and 112 pounds (51 kg) per hour respectively. Enough water was added at intervals to keep the uncombined water content in the mixer at about 13%. The sojourn time was calculated to be about 15 minutes. When slurry product overflowed from the discharge port, samples were taken as in Example 1, with results as given in Table I.

TABLE I

| Time Hr. | % $H_2O$ | % $Na_2CO_3$ | Na:P |
|---|---|---|---|
| 0 | 13.3 | — | 1.61 |
| 0.4 | — | 3.0 | 1.56 |
| 0.8 | 12.5 | 2.0 | 1.52 |
| 1.3 | 13.3 | 1.3 | — |
| 2.0 | — | 1.35 | — |
| 3.0 | — | 1.3 | — |
| 4.9 | — | — | 1.48 |

EXAMPLE 3

The procedure and techniques of Example 2 were employed except that granular natural soda ash and 85% phosphoric acid were added at a rate of 85.8 pounds (39 kg) and 112 pounds (51 kg) per hour respectively, to provide a molar Na:P ratio of about 1.67. It was observed that instead of a smooth, non-viscous slurry, as in Example 2, the product discharged as coarse, granular lumps, obviously non-homogeneous. The results, Table II, showed that the reaction was far from complete which illustrates that under otherwise identical conditions of operation, it is not feasible to use granular natural soda ash exclusively to prepare STP precursor slurry at a 1.67 molar Na:P ratio. The run time was two and one-half hours.

TABLE II

| Time Hr. | % $Na_2CO_3$ | Na:P |
|---|---|---|
| 1.25 | 6.6 | 1.65 |
| 1.50 | 8.3 | 1.66 |
| 2.25 | 13.2 | 1.67 |
| 2.50 | 12.4 | 1.69 |

EXAMPLE 4

In equipment as described in Example 2, but followed by a tank equipped with an agitator for adjustment of the molar Na:P ratio with 50% aqueous sodium hydroxide, a reaction medium was prepared as shown in Example 2. Granular natural soda ash and 85% phosphoric acid were then added simultaneously to the primary reactor at a rate of 78.8 pounds (36 kg) and 112 pounds (51 kg) per hour respectively. Enough water was added at intervals to keep the uncombined water content in the range of about 7 to 15% by weight. The process was operated for a period of five and one-half hours. Samples for analysis were taken from product overflowing from the primary reactor with results as shown in Table III.

The product was continuously adjusted to a molar Na:P ratio of about 1.67 in the stirred adjustment tank and samples for analysis were taken when the product overflowed the adjustment tank for collection, with results as shown in Table IV.

TABLE III

| | Primary Reactor* | | |
|---|---|---|---|
| Time Hr. | Na:P | % $Na_2CO_3$ | % Solids |
| 1.25 | 1.531 | 1.8 | 86.8 |
| 1.75 | 1.538 | 1.2 | 88.6 |
| 2.25 | 1.543 | 1.07 | 90.6 |
| 2.75 | 1.535 | — | 91.9 |
| 3.25 | 1.546 | 1.4 | 90.7 |
| 3.75 | 1.518 | — | 92.7 |
| 4.25 | 1.513 | — | 92.3 |
| 4.75 | 1.528 | 1.0 | 92.8 |
| 5.25 | 1.523 | — | 93.2 |

*Calculated sojourn time 45 minutes.

TABLE IV

| | Adjustment Tank* | | |
|---|---|---|---|
| Time Hr. | Na:P | % $Na_2CO_3$ | % Solids |
| 1.75 | 1.674 | — | — |
| 2.25 | 1.675 | — | — |
| 2.75 | 1.667 | — | 79.8 |
| 3.25 | 1.669 | — | — |
| 3.75 | 1.665 | 0.6 | 80.0 |
| 4.25 | 1.706 | — | — |
| 4.75 | 1.696 | 0.5 | 80.1 |
| 5.25 | 1.675 | — | — |
| 5.30 | 1.659 | 0.6 | 81.0 |

*Calculated sojourn time 1 hour.

Samples of the adjusted slurry were dried rapidly at 110° C., milled and calcined at 450° C. The calcined product was analyzed for STP content with results as shown in Table V along with the assay for tetrasodium pyrophosphate, sodium trimetaphosphate, sodium orthophosphate and the molar Na:P ratio.

TABLE V

| Sample No | 1 | 2 | 3 | 4 | Ref.* |
|---|---|---|---|---|---|
| % STP | 95.77 | 93.52 | 94.50 | 94.20 | 86.7 |
| % Pyro. | 2.2 | 2.5 | 4.3 | 4.4 | 10.2 |
| % Trimeta. | 2.4 | 3.0 | 1.1 | 1.3 | 2.2 |
| % Ortho. | 0.9 | 0 | 0.1 | 0.1 | 0.9 |
| Na:P | 1.65 | 1.67 | 1.68 | 1.67 | 1.68 |

*A reference sample taken from an existing commercial process using Solvay process light soda ash and phosphoric acid.

Although the invention has been described in terms of specified embodiment which are set forth in considerable detail, it should be understood that this is by way of illustration only and that the invention is not necessarily limited thereto since alternative embodiments and operating techniques will become apparent to those skilled in the art in view of the present disclosure. Accordingly, modifications are contemplated which can be made without departing from the spirit of the described invention.

What is claimed is:

1. A continuous slurry process for preparing a double salt $Na_3H_3(PO_4)_2$ containing less than about 2% by weight unreacted soda ask which comprises:
    (a) providing a reaction medium at a temperature above 80° C. having a molar Na:P ratio in the range of about 1.42 to about 1.58 and uncombined water content in the range of about 7% to about 20% by weight; and
    (b) adding to the reaction medium with agitation granular natural soda ash and a mixture consisting essentially of 75-92 weight percent $H_3PO_4$ and 8-25% $H_2O$ substantially simultaneously in such proportions, rate and acid concentration to maintain said molar Na:P ratio and uncombined water content and to provide a sojourn time of at least 12 minutes at a temperature about 80° C.

2. The process of claim 1 wherein the molar Na:P ratio is from about 1.48 to about 1.56.

3. The process of claim 1 wherein the temperature is maintained in the range of about 90° to about 100° C.

4. The process of claim 1 wherein the mixture consisting essentially of $H_3PO_4$ and water comprises about 80-86% by weight $H_3PO_4$.

5. The process of claim 1 and the sojourn time is at least 15 minutes.

6. The process of claim 5 wherein the molar Na:P ratio is from about 1.48 to about 1.56 and the phosphoric acid is about 85% by weight $H_3PO_4$.

7. The process of claim 6 wherein the sojourn time is about 15 to 60 minutes.

8. The process of claim 6 wherein the uncombined water content is in the range of about 10% to about 17% by weight.

9. The process of claim 6 wherein the molar Na:P ratio is about 1.53; the phosphoric acid is about 85% by weight $H_3PO_4$ and the uncombined water content is about 15% by weight.

10. A continuous slurry process for the preparation of pentasodium tripolyphosphate precursor which comprises:
    (a) providing a reaction medium at a temperature above about 80° C. having a molar Na:P ratio in the range of about 1.42 to about 1.58 and uncombined water content of about 7% to about 20% by weight;
    (b) adding to the reaction medium with agitation granular natural soda ash and a mixture consisting essentially of 75-92% by weight $H_3PO_4$ and 8-25% by weight $H_2O$ substantially simultaneously in such proportions, rate and acid concentration to maintain said molar Na:P ratio and said uncombined water content and to provide a sojourn time of at least 12 minutes at a temperature about 80° C., thereby forming a slurry product;
    (c) passing the slurry of (b) to a separate mixer; and
    (d) reacting the slurry at a temperature of at least 95° C. in the separate mixer with sufficient amount of aqueous sodium hydroxide to provide a resultant slurry having a molar Na:P ratio of about 1.64 to about 1.70.

11. The process of claim 10 wherein the reaction medium of (a) has a molar Na:P ratio in the range of about 1.48 to about 1.56 and uncombined water content of about 10% to about 17% by weight; the mixture of (b) is about 85% by weight $H_3PO_4$; and the aqueous sodium hydroxide of (d) is 50% by weight sodium hydroxide and an amount sufficient to provide a resultant slurry having a molar Na:P ratio of about 1.67.

* * * * *

UNITED STATES PATENT AND TRADEMARK OFFICE
CERTIFICATE OF CORRECTION

PATENT NO. : 4,661,331
DATED : April 28, 1987
INVENTOR(S) : Stahlheber et al

It is certified that error appears in the above-identified patent and that said Letters Patent are hereby corrected as shown below:

Column 1, line 51, delete "$Na_2HPO_4 \cdot 2Hz_2O$" and substitute therefor

--$Na_2HPO_4 \cdot 2H_2O$--.

Column 2, line 1, delete "$Na_2H_3(PO_4)_2$) and substitute therefor

--$Na_3H_3(PO_4)_2$)

Column 7, line 38, delete "about" and substitute therefor

--above--.

Column 8, line 30, delete "about" and substitute therefor

--above--.

Signed and Sealed this

Twenty-second Day of September, 1987

Attest:

DONALD J. QUIGG

Attesting Officer

Commissioner of Patents and Trademarks